United States Patent
Doi et al.

[11] Patent Number: 6,119,119
[45] Date of Patent: *Sep. 12, 2000

[54] DATA SUPPLYING METHOD AND DEVICE THEREFOR

[75] Inventors: Toshitada Doi; Makoto Ishii, both of Kanagawa, Japan

[73] Assignee: Sony Corporation, Tokyo, Japan

[*] Notice: This patent is subject to a terminal disclaimer.

[21] Appl. No.: 09/311,002

[22] Filed: May 13, 1999

Related U.S. Application Data

[63] Continuation of application No. 08/760,978, Dec. 5, 1996, Pat. No. 5,953,721.

[30] Foreign Application Priority Data

Dec. 15, 1995 [JP] Japan ................................. 7-347751

[51] Int. Cl.[7] ................................................. G06F 17/30
[52] U.S. Cl. ...................... 707/100; 707/200; 707/201; 705/37; 705/401; 705/409
[58] Field of Search ................................. 707/100, 200; 705/409, 37, 401, 4; 380/4

[56] References Cited

U.S. PATENT DOCUMENTS

| 4,486,853 | 12/1984 | Parsons ................................. 364/900 |
| 5,262,942 | 11/1993 | Earle ..................................... 364/408 |
| 5,325,523 | 6/1994 | Beglin et al. ........................... 395/600 |
| 5,347,651 | 9/1994 | Burke et al. ............................. 395/60 |
| 5,386,369 | 1/1995 | Christiano ........................ 364/464.01 |
| 5,555,371 | 9/1996 | Duyanovich et al. ............. 395/182.11 |
| 5,699,258 | 12/1997 | Thiel ................................. 364/464.19 |

*Primary Examiner*—Thomas G. Black
*Assistant Examiner*—Frantz Coby
*Attorney, Agent, or Firm*—Limbach & Limbach, LLP

[57] ABSTRACT

In a data providing method and device thereof for providing data in a simple manner at a highly efficient transmission rate, first data of a configuration where information relating to a valid period of data is added to the data is made and provided, with the first data being categorized and stored in accordance with the information. Information for second data of the same configuration as the first data is then recognized and the first data is replaced with the second data in accordance with results of the recognition.

14 Claims, 5 Drawing Sheets

A: header possessing type and number etc. of core data
B: bit showing presence of valid period of data
C: valid period of data
D: core data

| Aa | Ba | Ca | Da |
|---|---|---|---|
| type :a<br>number : 1500 | N | | product summary<br>(Model No., Function, Feature etc.) |

DTa

FIG. 7

| Ab | Bb | Cb | Db |
|---|---|---|---|
| type : a<br>number : 1501 | Y | 1. 1. 95~<br>12. 31. 95 | product price list |

DTb

FIG. 8

| Abb | Bbb | Cbb | Dbb |
|---|---|---|---|
| type : a<br>number : 1502 | Y | 1. 1. 96~<br>12. 31. 96 | product price list |

DTbb

DATA SUPPLYING METHOD AND DEVICE THEREFOR

This is a continuation of application Ser. No. 08/760,978, filed Dec. 5, 1996 now U.S. Pat. No. 5,953,721.

BACKGROUND OF THE INVENTION

The present invention relates to a method for providing data from a data providing side to a data receiving side via a data transmission means, and device thereof.

Data provided from data providers to data receivers via data transmission means such as, for example, communications satellites, telephone lines and optical fiber cables etc. can be roughly divided into two groups. On the one hand, there is data where it is advantageous both for the data provider and the data receiver for the data to have a long or limitless period of validity so that the data can be used for a long period of time. On the other hand, there is data where it is advantageous for both the data provider and the data receiver of the data for the data to have a short valid period so that the data is only used for a short period of time.

Data having a long or limitless period of validity is data such as product summaries occurring in the communications business, while data having a short period of validity is data such as data listing product prices. Data having a valid period is no longer valid once the valid period is over and after the valid period is over data having an updated valid period therefore has to be sent from the data provider to the data receiver via a data transmission means.

However, when data configured so that short period valid data is included as a part of data having a long or indefinite period of validity is provided using related data-providing methods, all of the data for the short period valid data including the long period valid data had to be updated every time the period for the short valid period data expired. This is troublesome with regards to the providing of the data and transmission efficiency is lowered.

As the present invention sets out to resolve the above problems, it is therefore the object of the present invention to provide a data providing method and device thereof capable of providing data easily at a high transmission efficiency.

SUMMARY OF THE INVENTION

A data providing method for providing data according to the present invention therefore comprises the steps of producing and providing first data (e.g. data DTb) having a region including information relating to a valid period of data, receiving the first data, categorizing the first data in accordance with the information relating to the valid period and then storing the first data after being categorized, providing second data (e.g. data DTbb) of the same format as the first data, receiving the second data, recognizing the second data with respect to information relating to the valid period and replacing the first data with the second data in accordance with results of the recognition.

The information relating to the valid period of data can include data of the valid period and data showing presence of the data of the valid period.

Further, a data providing method for providing data is therefore provides so as to comprise the steps of combining data (e.g. data DTa) not including data showing a valid period of data and first data (e.g. data DTb) including data showing a valid period of data and then providing the data as being combined, receiving the data as being combined, categorizing the data not including data showing the valid period of data and the first data in accordance with information relating to the valid period of data and then storing the data after being categorized, providing second data (e.g. data DTbb) of the same format as the first data, recognizing the second data with respect to information relating to data showing a valid period of the second data and replacing the first data with the second data in accordance with results of the recognition.

The first data can be replaced with the second data when the second data is determined to be updated data for the first data from the recognition results.

Further, according to the present invention, a data providing device comprises a data provider and a data receiver. The data provider comprises a data producing section for producing first data (e.g. data DTb) having a region including information relating to a valid period of data. The data receiver comprises a storage section for categorizing the first data in accordance with the information relating to the valid period, storing the first data being categorized second data (e.g. data DTbb) of the same format as the first data provided by the data provider with respect to information relating to a valid period of the second data and replacing the first data with the second data in accordance with results of the recognition. Here, the data provider provides data therefrom to the data receive via the data transfer means.

The data producing section can provide data of the valid period and data showing presence of the data of the valid period as information relating to the valid period of the data.

Moreover, the storage section can comprise a categorizing section, a storage section, a recognizing section and a replacing section. The categorizing section is for categorizing the first data in accordance with the information relating to the valid period. The storage section is for storing the first data being categorized. The recognizing section is for recognizing the second data of the same format as the first data provided from the data provider with respect to information relating to a valid period of the second data and the replacing section is for replacing the first data with the second data in accordance with results from the recognizing section and storing the second data in the storing section.

The replacing section can replace the first data with the second data when the recognizing section recognizes the second data as being updated data for the first data.

Further, according to the present invention, a data receiving device for receiving data having an area for information relating to a valid period from a data providing device via a data transfer means, comprises a data categorizing means, a data storing means, a data recognition means and a data replacing means. The data categorizing means is for categorizing first data in accordance with information relating to the valid period. The data storing means is for storing the first data being categorized. The data recognition means is for recognizing second data of the same format as the first data with respect to information of a valid period of the second data and the data replacing means is for replacing the first data stored in the data storing means with the second data in accordance with results from the data recognition means.

Further, according to the present invention, a data receiving device for receiving data having an area for information relating to a valid period from a data providing device via a data transfer means, comprises a data categorizing section, a data storage section and a data recognizing section. The data categorizing section is for categorizing data in accordance with information relating to the valid period. The data storage section is for storing the categorized data. The data recognizing section is for recognizing the categorized data with respect to information relating to the valid period. Here, the data categorizing section categorizes data when the data is provided from the data providing device as a combination of data A (e.g. data DTa) and data B (e.g. data DTb). The data A includes data for which the information relating to the valid period is given as showing that the valid period is limitless. The data B includes data for which the information is given as showing that the valid period is short. The categorizing section then transmits the data A to the data storage section and the data B to the data recognizing section on the basis of the information. The data recognizing section recognizes whether or not data to be updated by being replaced with the data B is already stored in the storage section, and the data storage section stores the data B so that the data B is made to correspond to the data A when the data recognizing section recognizes that no data is stored at the storage section.

Moreover, the data receiving device can further comprise a data replacing section for replacing data stored in the storage section and when data is provided from the data providing device as data C (e.g. data DTbb) that includes data for which the information relating to the valid period is given as showing that the valid period is short, the data categorizing section categorizes the data C to be transmitted to the recognizing section on the basis of the information, the recognizing section recognizes whether or not the data C is update data for the data B already stored in the data storage section and the data replacing section replaces the data B with the data C so that the data C is stored in the data storage section when the data C is recognized as being update data.

DETAILED DESCRIPTION OF THE PREFERRED EMBODIMENTS

First Embodiment

The following is a detailed description, with reference to the drawings, of an embodiment of the present invention.

In the embodiment described in the following, the details of a preferred example of this invention is described, with various preferred technological limitations being enforced as a result. However, the scope of the present invention is by no means limited by the following and is particularly by no means limited with respect to the limitations placed in the following.

Figure 1:
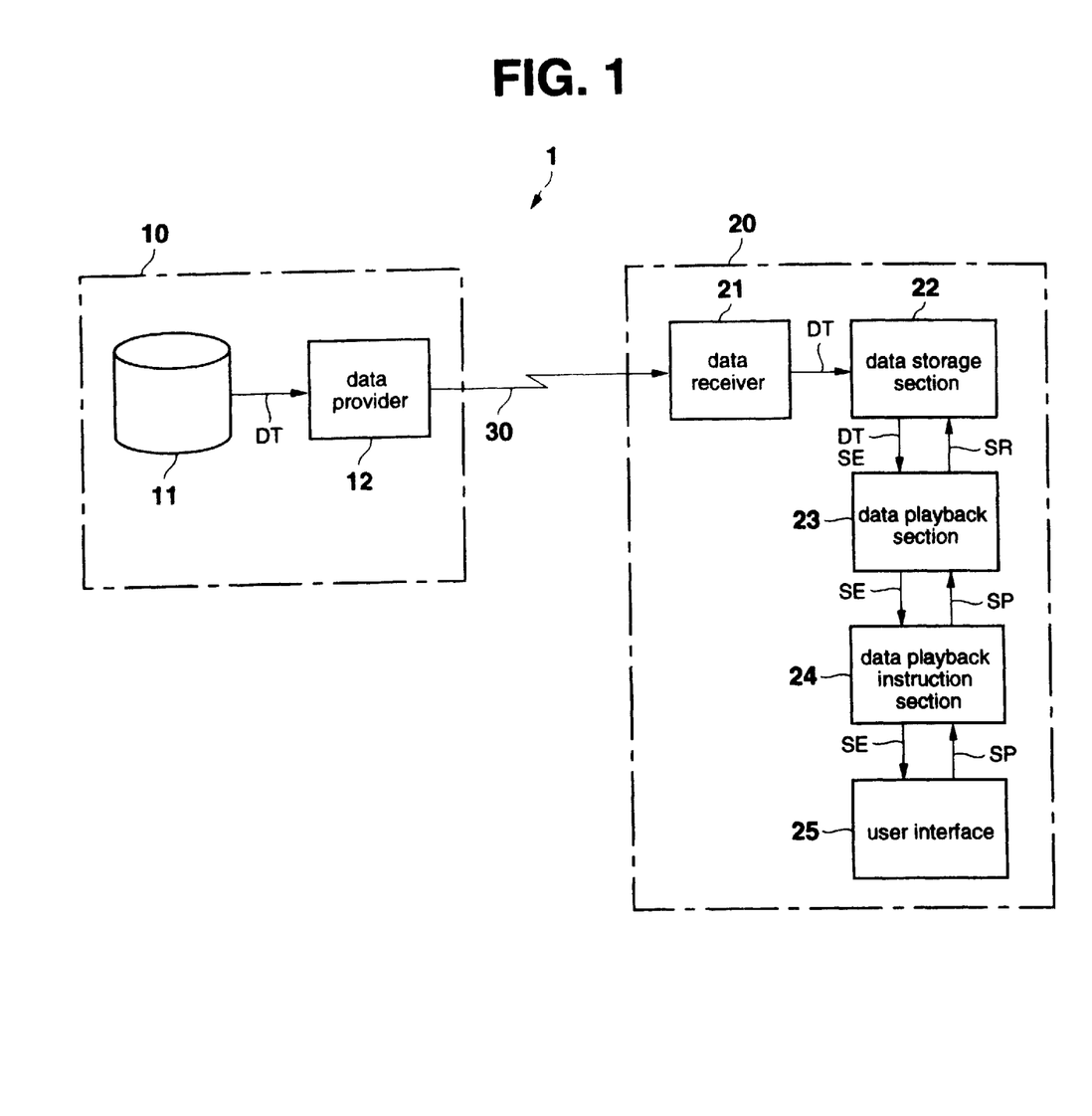
FIG. 1 is a block diagram showing an embodiment of a data providing device of the present invention.

FIG. 1 is a block diagram showing an embodiment of a data providing device of the present invention.

This data providing device 1 is configured in such a manner that a data providing means 10 on a data providing side and a data receiving means 20 on a data receiving side are connected via a data path 30 constituting a data transmission means.

The data providing means 10 provides data DT made at a data producer 11 from a data provider 12 via the data path 30.

The data receiving means 20 stores the data DT received at a data receiver 21 at a data storage section 22 via the data path 30. The data DT stored at the data storage section 22 is then played back at a data playback section 23 in accordance with a data playback instruction SP from a data playback instruction section 24 that came via a user interface 25.

The services provided by the data providing device 1 are not specified here but can be, for example, data services using communications satellites, data services using the Internet or data services using physical media such as compact disc read-only memories (CD-ROMs). Data transmission means such as, for example, communications satellites, telephone lines, optical fiber cables or the postage system can therefore be used as the data path 30. The data providing means 10 can include broadcasting stations, data service providers, publishers and post offices. A tuner or decoder can then be provided at the data receiving means 20 when, for example, a broadcast satellite, telephone line, or optical fiber cable etc. is used as the data path 30.

Figure 2:
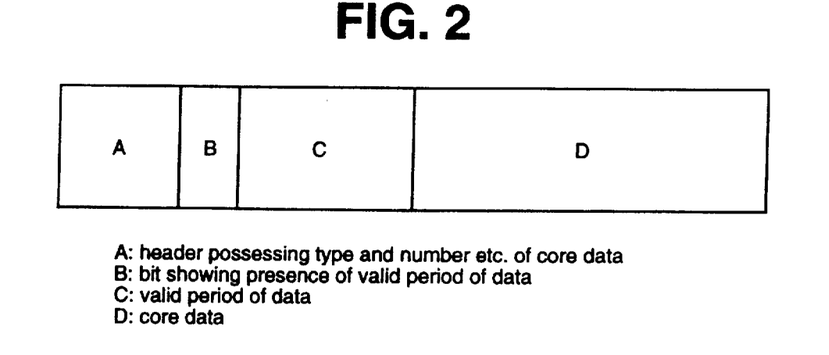
FIG. 2 is a view showing an example of a data format used by the data providing device shown in FIG. 1.

The format of the data DT provided by the data providing device 1 is as shown, for example, in FIG. 2. Here, D is the data provided to the user and is referred to as the core data, A differs depending on the service provided but is basically a header containing the type and number etc. of the core data D, B is a bit showing whether or not the core data D possessed by the header A has a valid period and C is a bit showing the valid period when a validity bit is shown to exist at the bit B and is set with the year, month, day, hour, minutes and seconds etc. for the usefulness.

Figure 3:
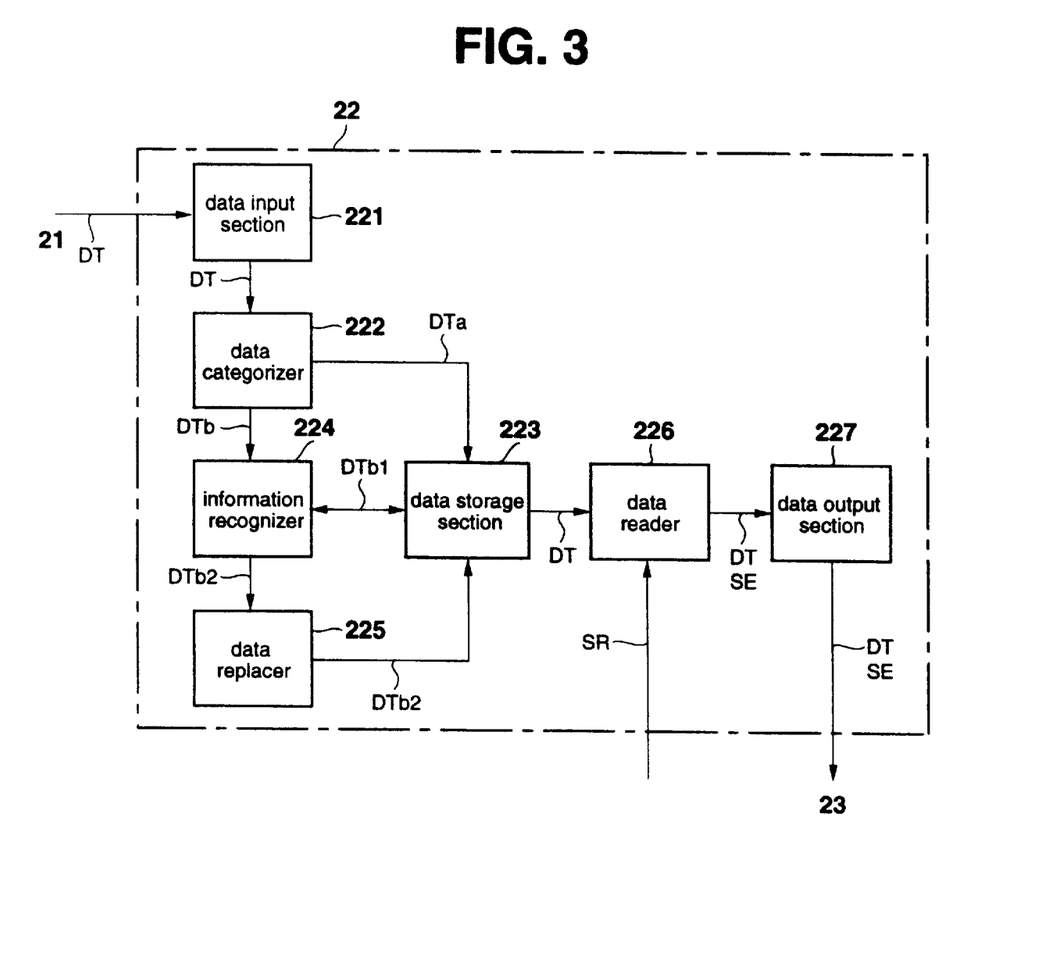
FIG. 3 is a block diagram showing a detailed example of the essential parts of the data providing device shown in FIG. 1.

FIG. 3 is a block diagram showing the details of the data storage section 22.

The data storage section 22 categorizes data DT inputted to a data categorizer 222 from the data receiver 21 via a data input section 221 into data DTa having a long or limitless valid period and data DTb having a short valid period using the header A and bit B. The categorized data DTa is stored at a data storage section 223 and the categorized data DTb is outputted to an information recognizer 224. The data DTb inputted to the information recognizer 224 is recognized with respect to necessity of data replacement using the bit C. The data DTb1 recognized as having no necessity of being replaced is stored in the data storage section 223 and the data DTb2 recognized as having necessity of being replaced is outputted to a data replacer 225 to be replaced with replacement data DTb1 stored in the data storage section 223. Data DT stored in the data storage section 223 and instructed to be read out is read out in accordance with the data read instruction SR inputted at a data reader 226 from the data playback section 23 and is outputted to the data playback section 23 via a data output section 227.

Figure 4:
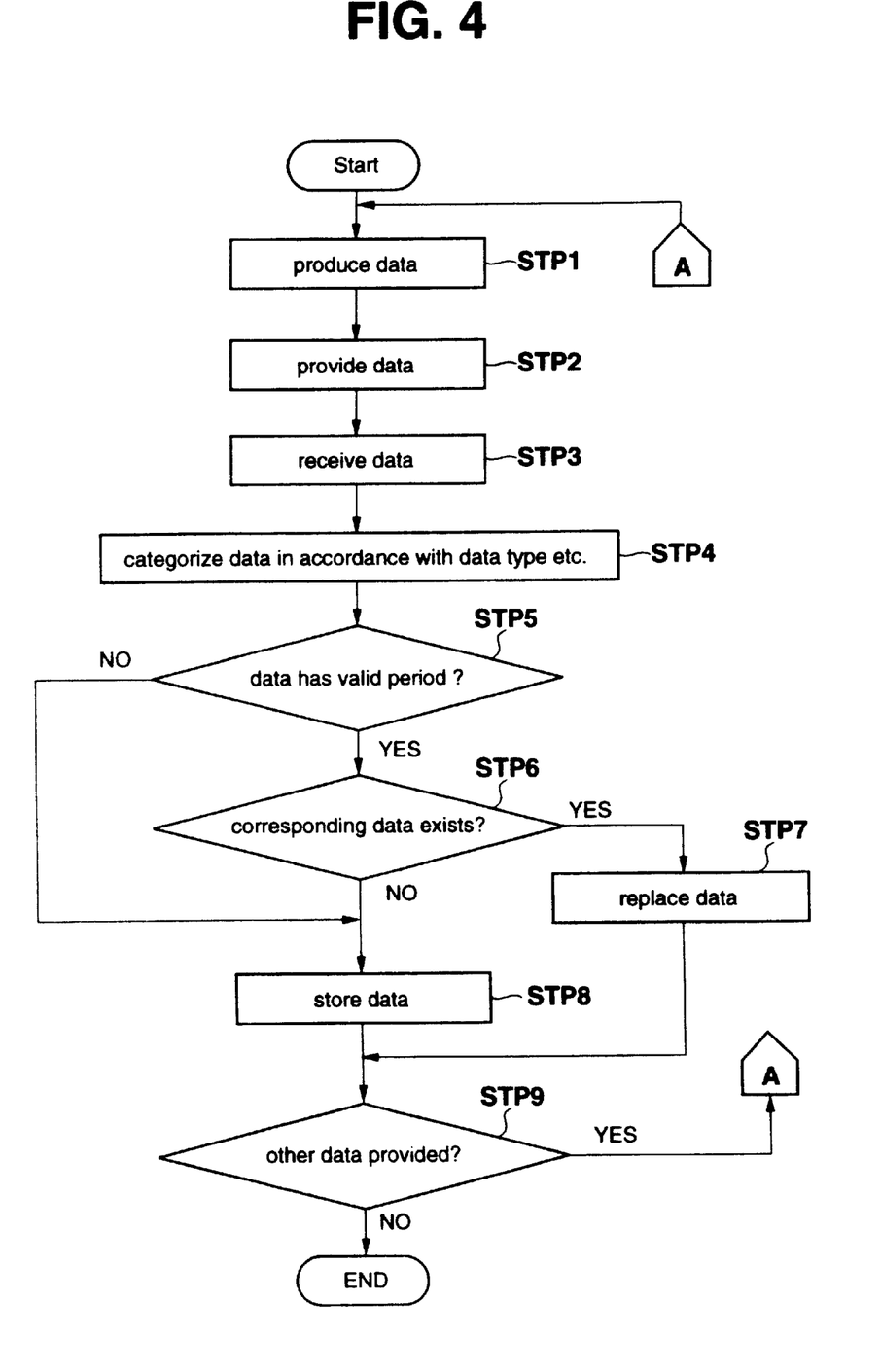
FIG. 4 is the first part of a flowchart illustrating an example of the operation of the data providing device shown in FIG. 1.
Figure 5:
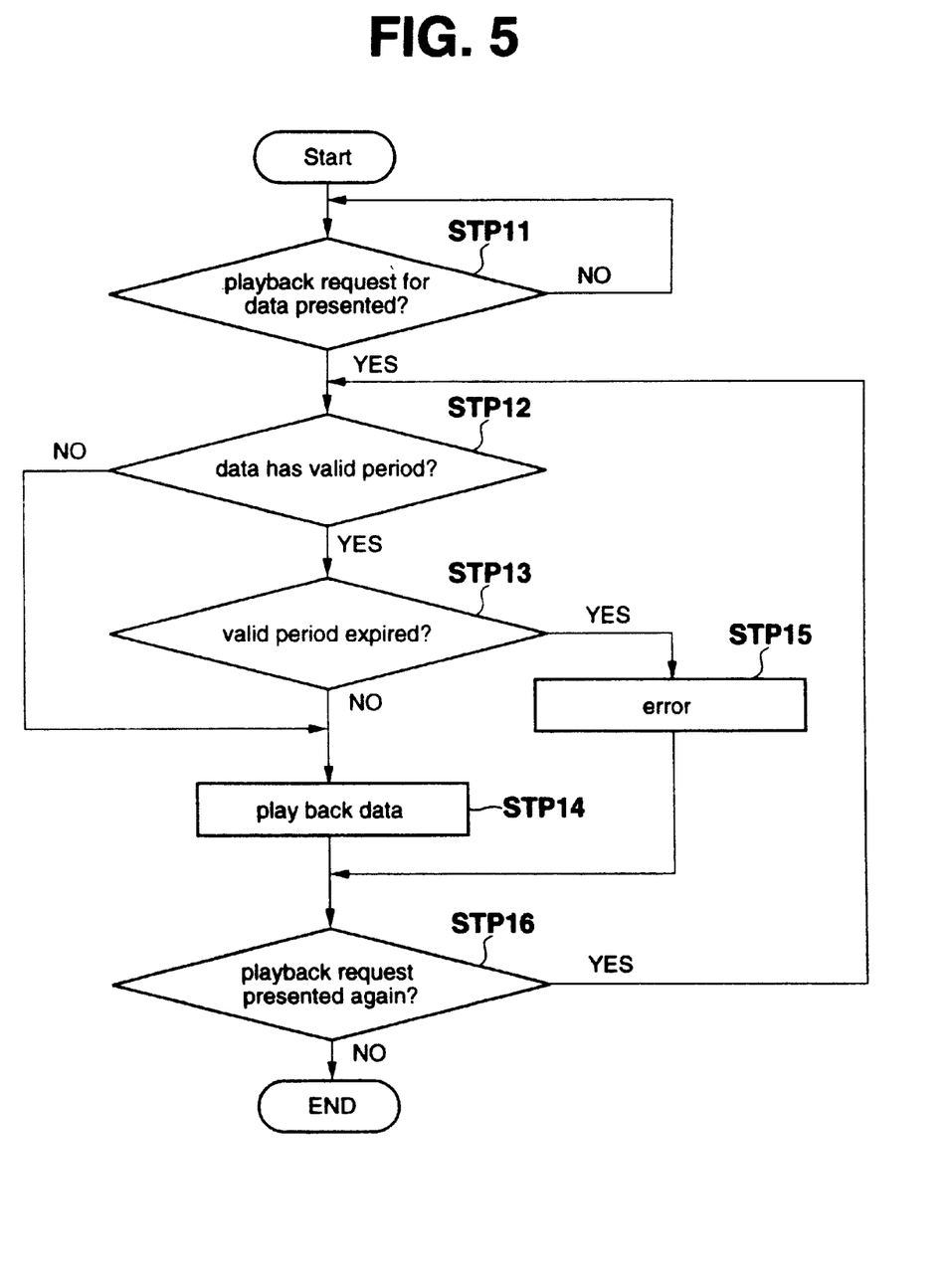
FIG. 5 is the second part of the flowchart illustrating the example of the operation of the data providing device shown in FIG. 1.

An example of the operation of this kind of configuration will now be described with reference to FIG. 4 and FIG. 5. FIG. 4 is a flowchart of an example operation viewed from the side of the data provider and FIG. 5 is a flowchart of an example operation viewed from the side of the data receiver.

Figure 6:
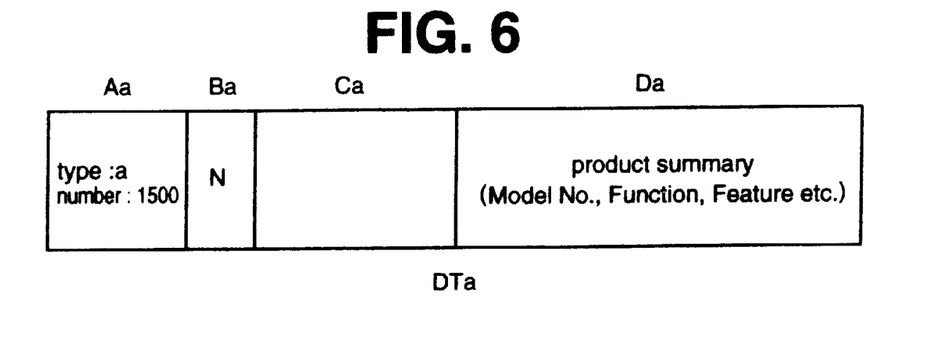
FIG. 6 is a view showing an example of data having limitless valid period with the data format shown in FIG. 2.
Figure 7:
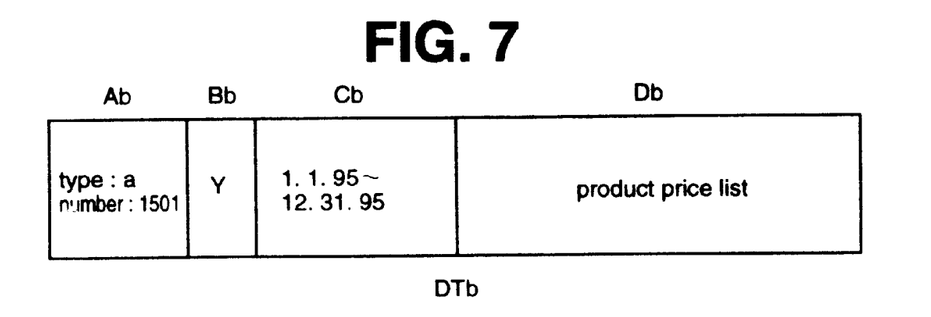
FIG. 7 is a view showing an example of a first data having short valid period with the format shown in FIG. 2.

First, at the data producer 11 in the data providing means 10, a data group DT configured from a combination of, for example, data DTa of a limitless valid period (for example, FIG. 6) and data DTb of a short valid period (for example, FIG. 7) is produced (step STP1) and outputted to the data provider 12.

At the data provider 12, the data group DT inputted from the data producer 11 is provided to the data receiver 21 in the data receiving means 20 via the data path 30 (step STP2).

At the data receiver 21, the data group DT provided via the data path 30 is received (step STP3) and outputted to the data categorizer 222 via the data input section 221 comprising the data storage section 22 in FIG. 3.

At the data categorizer 222, the data DTa with the limitless valid period and the data DTb with the short valid period, which constitute the data group DT inputted from the data input section 221, are categorized by identifying the respective core data Da and Db for the data DTa and DTb with respect to the type and number etc. by using the headers Aa and Ab thereof (step STP4). The core data Da and Db are further identified with respect to whether or not they have a valid period by using the bits Ba and Bb, in accordance with which the data DTa and DTb are further categorized (step STP5).

Since the core data Da for the data DTa in this example is given as having no valid period, the data DTa is then stored in the data storage section 223 (step STP8). On the other hand, the core data Db for the data DTb is given as having a valid period, then the data DTb is outputted to the information recognizer 224.

At the information recognizer 224, the presence of corresponding data is recognized for the data stored within the data storage section 223 by using the header Ab and the bit Cb of the data DTb inputted from the data categorizer 222 (step STP6). Here, corresponding data is referred to as being previously supplied data stored in the data storage section 223 for which the valid period has expired, with the type and number etc. of the core data being the same as data DTb supplied this time. In this example no corresponding data is previously stored and the as-inputted data DTb is therefore stored at the data storage section 223 (step STP8).

Figure 8:
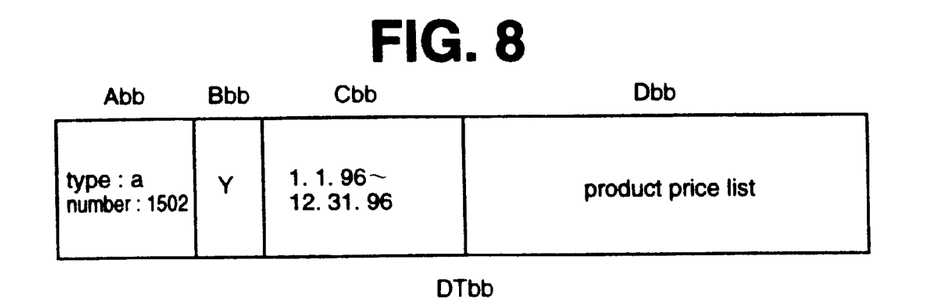
FIG. 8 is a view showing an example of a second data having short valid period with the format shown in FIG. 2.

Next, the presence of other supplied data is recognized (step STP9). When, for example, the valid period of the data DTb has expired so that this core data Db has become invalid, updated data DTbb (for example, shown in FIG. 8) for the short valid period data DTb is produced except the data DTa of a limitless valid period at the data producer 11 in the data providing means 10 in FIG. 1 (step STP1) and outputted to the data provider 12.

At the data provider 12, data DTbb inputted from the data producer 11 is provided to the data receiver 21 via the data path 30 (step STP2).

At the data receiver 21, the data DTbb supplied via the data path 30 is received (step STP3) and then the data DTbb is outputted to the data categorizer 222 via the data input section 221 comprising the data storage section 22.

At the data categorizer 222, the type and number etc. of the core data Dbb for the data DTbb is identified using a header Abb of the data DTbb inputted from the data input section 221 and the data DTbb is categorized (step STP4). The core data Dbb is further identified with respect to whether or not the core data Dbb has a valid period by using the bit Bbb, in accordance with which the data DTbb is further categorized (step STP5).

In this example, the core data Dbb of the data DTbb has a valid period, so that the data DTbb is then outputted to the information recognizer 224. At the information recognizer 224, the presence of corresponding data is recognized about the data stored within the data storage section 223 using the header Abb and the bit Bbb of the data DTbb inputted from the data categorizer 222 (step STP6). In this example, corresponding data DTb is stored within the data storage section 223 and the data DTbb is outputted to the data replacer 225. Then, at the data replacer 225, the data DTb stored at the data storage section 223 is replaced with the data DTbb (step STP7).

As described above, it is sufficient to just provide updated short valid period data as data provided after the valid period of short valid period data has expired even for data configured in such a manner that short valid period data is included as a part within limitless valid period data. It is therefore no longer necessary to provide data including unlimited valid period data in the way that was necessary in the related art and the transmission efficiency can therefore be raised.

When the data receiver wishes to play back the data DTa of a limitless valid period, the data receiver inputs SPa as a data playback instruction SP from the data playback instruction section 24 via the user interface 25.

The data playback section 23 then recognizes presence of a playback request for the data DTa from the data playback instruction section 24 (step STP11 in FIG. 5) and when the playback request for the data DTa is presented, a read out instruction SR is outputted as SRa to the data reader 226 for this data DTa.

The data reader 226 then recognizes the core data Da for the data DTa stored at the data storage section 223 with respect to whether or not the core data Da has a valid period by using the bit B for the data DTa (step STP12). Then, because the core data Da of the data DTa in this example has no valid period, the core data Da for the data DTa stored in the data storage section 223 is read-out and outputted to the data playback section 23 via the data output section 227. The core data Da for the data DTa inputted from the data output section 227 is then playedback via the data output section 227 (step STP14).

Next, when the data receiver wishes to play back the short valid period data DTbb, the data receiver inputs SPbb as a data playback instruction SP from the data playback instruction section 24 is inputted via the user interface 25.

The presence of a playback request for the data DTbb from the data playback instruction section 24 is then recognized at the data playback section 23 (step STP11). When the playback request for the data DTbb is presented, a read out instruction SR for reading out this data DTbb is outputted as SRbb to the data reader 226 in FIG. 3.

The data reader 226 then recognizes the core data Dbb of the data DTbb stored at the data storage section 223 with respect to whether or not the core data Dbb has a valid period by using the bit Bbb of the data DTb (step STP12). Then, because the core data Dbb of the data DTbb of this example has a valid period, a recognition is made as to whether or not the valid period of the core data Dbb for the data DTbb has expired by using the bit Cbb of the data DTbb (step STP13). Then, because the valid period of the core data Dbb for the data DTb has not expired in this example, the core data Dbb for the data DTbb stored in the data storage section 223 is read out and outputted to the data playback section 23 via the data output section 227.

The core data Dbb for the data DTbb inputted from the data output section 227 is played back at the data playback section 23 (step STP14).

The operation for when the data receiver makes a request to playback short valid period data when the updated short valid period data DTbb has not been used for replacing regardless of whether the valid period of the short valid period data has expired so that the core data Db for the data DTb is invalid is carried out in step STP13 onwards. Namely, whether or not the valid period of the core data Db for the data DTb has expired is recognized using the bit Cb for the data DTb (step STP13). Then, because the valid period of the core data Db for the data DTb has expired in this case, an error signal SE of a message of, for example, "playback is not possible because the valid period of the core data Db for the data DTb has expired" is outputted at the data playback instruction section 24 via the data output section 227 and the data playback section 23 (step STP15), with the data receiver being informed of this via the user interface 25. It is also possible at the data reader 226 at this time to erase the data DTb for which the valid period has expired from the data storage section 223. This prevents data for which the valid period has expired from being mistakenly played back.

Then, the presence of a request for playing back of the data DT from the data playback instruction section 24 is recognized at the data playback section 23 in FIG. 1 (step STP16). When a playback request for the data DT is presented, the flow is returned to step STP12 and the aforementioned operation is repeated.

The data providing side operation described using FIG. 4 and the data receiving side operation described using FIG. 5 are executed independently, i.e. the reading and playing back of other data is possible even while data is being transmitted and stored.

In the aforementioned embodiment, data stored at the data storage section 223 is stored in accordance with the data type, number or valid period, or stored in the sequence received and then arranged during the playing back of the data in accordance with the data type, number or valid period.

According to the present invention, transmission efficiency can be dramatically improved by only providing updated short valid period data after the valid period of short valid period data has expired even for the providing of data configured in such a manner that short valid period data is included as a part of data of a long or limitless valid period.

What is claimed is:

1. A data providing method for providing data comprising the steps of:
   producing and providing first data, said first data having a given format and a region including information relating to a valid period of data;
   receiving said first data;
   categorizing said first data in accordance with said information relating to said valid period and then storing said first data after being categorized;
   providing second data having said given format;
   receiving said second data;
   recognizing said second data with respect to information relating to said valid period; and
   replacing said first data with said second data in accordance with results of said recognition.

2. A data providing method for providing data comprising the steps of:
   combining data not including data showing a valid period of data and first data including data showing a valid period of data and then providing said data as being combined, said data as being combined having a given format;
   receiving said data as being combined;
   categorizing said data not including data showing said valid period of data and said first data in accordance with information relating to said valid period of data and then storing said data after being categorized;
   providing second data having said given format;
   receiving said second data;
   recognizing said second data with respect to information relating to data showing a valid period of said second data; and
   replacing said first data with said second data in accordance with results of said recognition.

3. A data providing method according to claim 2, wherein said first data is replaced with said second data when said second data is determined to be updated data for said first data from said recognition results.

4. A data providing device comprising:
   a data provider including a data producing section configured to produce first data, said first data having a given format and a region including information relating to a valid period of data; and
   a data receiver including a storage section configured to categorize said first data in accordance with said information relating to said valid period, to store said first data after being categorized, to recognize second data having said given format provided by said data provider with respect to information relating to a valid period of said second data, and to replace said first data with said second data in accordance with results of said recognition;
   said data provider providing said data therefrom to said data receiver via data transfer means.

5. A data providing device according to claim 4, wherein said storage section comprises:
   a categorizing section configured to categorize said first data in accordance with said information relating to said valid period;
   a storing section configured to store said first data after being categorized;
   a recognizing section configured to recognize said second data as said first data provided from said data provider with respect to said information relating to a valid period of said second data; and
   a replacing section configured to replace said first data with said second data in accordance with results from said recognizing section and to store said second data in said storing section.

6. A data providing device according to claim 5, wherein said replacing section is configured to replace said first data with said second data when said recognizing section recognizes said second data as being updated data for said first data.

7. A data receiving device for receiving data having an area for information relating to a valid period from a data providing device via a data transfer means, comprising:
   data categorizing means for categorizing first data in accordance with information relating to a valid period, said first data having a given format;
   data storing means for storing said first data being categorized;
   data recognition means for recognizing second data having said given format with respect to information relating to a valid period of said second data; and
   data replacing means for replacing said first data stored in said data storing means with said second data in accordance with results from said data recognition means.

8. A data providing method for providing data comprising the steps of:
- producing first data, said first data having a given format and a region including information relating to a valid period of data;
- providing said first data in accordance with said step of producing said first data;
- receiving said first data;
- categorizing said first data in accordance with said information relating to said valid period and then storing said first data after being categorized;
- producing second data having said given format;
- providing said second data in accordance with said step of producing said second data;
- receiving said second data;
- recognizing said second data with respect to information relating to said valid period; and
- replacing said first data with said second data in accordance with results of said recognition.

9. A data providing method for providing data comprising the steps of:
- combining data not including data showing a valid period of data and first data including data showing a valid period of data and then producing said data as being combined, said data as being combined having a given format;
- providing said data as being combined in accordance with said step of producing said data as being combined;
- receiving said data as being combined;
- categorizing said data not including data showing said valid period of data and said first data in accordance with information relating to said valid period of data and then storing said data after being categorized;
- producing second data having said given format;
- providing said second data in accordance with said step of producing said second data;
- receiving said second data;
- recognizing said second data with respect to information relating to data showing a valid period of said second data; and
- replacing said first data with said second data in accordance with results of said recognition.

10. A data providing method according to claim 9, wherein said first data is replaced with said second data when said second data is determined to be updated data for said first data from said recognition results.

11. A data providing device comprising:
- a data provider including a data producing section configured to produce first data and a providing section configured to provide said first data in accordance with said data producing section, said first data having a given format and a region including information relating to a valid period of data; and
- a data receiver including a storage section configured to categorize said first data in accordance with said information relating to said valid period, to store said first data after being categorized, to recognize second data having said given format provided by said data provider with respect to information relating to a valid period of said second data, and to replace said first data with said second data in accordance with results of said recognition;
- said data provider providing said data therefrom to said data receiver via data transfer means.

12. A data providing device according to claim 11, wherein said storage section comprises:
- a categorizing section configured to categorize said first data in accordance with said information relating to said valid period;
- a storing section configured to store said first data after being categorized;
- a recognizing section configured to recognize said second data as said first data provided from said data provider with respect to said information relating to a valid period of said second data; and
- a replacing section configured to replace said first data with said second data in accordance with results from said recognizing section and to store said second data in said storing section.

13. A data providing device according to claim 12, wherein said replacing section is configured to replace said first data with said second data when said recognizing section recognizes said second data as being updated data for said first data.

14. A data receiving device for receiving data having an area for information relating to a valid period from a data providing device via a data transfer means, comprising:
- a data receiver configured to receive first data in accordance with production of said first data by said data providing device, said first data having a given format;
- a data categorizing section configured to categorize said first data in accordance with information relating to a valid period;
- a data storing section configured to store said first data being categorized;
- a data recognition section configured to recognize second data having said given format with respect to information relating to a valid period of said second data; and
- a data replacing section configured to replace said first data stored in said data storing means with said second data in accordance with results from said data recognition section.

* * * * *